United States Patent [19]

Clark

[11] Patent Number: 4,821,906

[45] Date of Patent: Apr. 18, 1989

[54] ICE CREAM CONE GUARD AND THE LIKE

[76] Inventor: Christopher Clark, 273 Hancock St., Brooklyn, N.Y. 11216

[21] Appl. No.: 150,137

[22] Filed: Jan. 29, 1988

[51] Int. Cl.[4] ............................................. B65D 3/06
[52] U.S. Cl. ....................................... 220/4 A; 99/645;
220/85 R; 229/DIG. 7; 426/112; 426/115;
426/132; 426/139
[58] Field of Search .................. 99/645; 229/DIG. 7,
229/1.5 H; 220/90.4, 4 A, DIG. 21, 85 R;
426/112, 115, 132, 135, 139, 90

[56] References Cited

U.S. PATENT DOCUMENTS

| | | | |
|---|---|---|---|
| 1,153,744 | 9/1915 | Allen | 426/132 |
| 1,569,568 | 1/1926 | Pederson | 426/132 |
| 1,616,570 | 2/1927 | Boynton | 426/139 |
| 1,672,884 | 6/1928 | Gingras | 229/DIG. 7 |
| 1,854,091 | 4/1932 | Young | 426/139 |
| 1,931,413 | 10/1933 | Notkin | 426/139 |
| 2,001,371 | 5/1935 | Thoke | 426/132 |
| 2,162,224 | 6/1939 | Legge | 426/115 |
| 2,362,595 | 11/1944 | Torrison | 229/1.5 H |
| 2,527,993 | 10/1950 | Habler | 426/139 |
| 2,557,602 | 6/1951 | Huitt et al. | 426/132 |
| 2,611,510 | 9/1952 | Willits | 220/85 R |
| 2,782,616 | 2/1957 | Eron | 229/1.5 H |
| 2,948,452 | 8/1960 | Grogan et al. | 229/DIG. 7 |
| 4,136,800 | 1/1979 | Christuer et al. | 426/139 |
| 4,444,795 | 4/1984 | Weinstein | 426/115 |
| 4,574,987 | 3/1986 | Halligan et al. | 426/115 |
| 4,720,037 | 1/1988 | Alpert | 229/DIG. 7 |

Primary Examiner—Stephen P. Garbe
Attorney, Agent, or Firm—Roberts, Spiecens & Cohen

[57] ABSTRACT

A conical receptacle for supporting a cone is provided with a shield mounted in a slide for variable extension relative to the receptacle. The slide is mounted on a portion of a cylinder affixed to the receptacle with a protrusion on the slide being provided for manipulation by a user.

13 Claims, 1 Drawing Sheet

ICE CREAM CONE GUARD AND THE LIKE

FIELD OF THE INVENTION

This invention relates to devices for receiving and enhancing conditions for the devouring of a foodstuff accommodated in and protruding from a receptacle and more particularly to devices suitable for receiving and enhancing the conditions for the devouring of foodstuffs such as ice cream cones and the like.

BACKGROUND

Various types of foodstuffs are commercially marketed in the form of scoops or the like accommodated in receptacles of various shapes. The receptacles may be fabricated of a material which is edible or may be fabricated of materials which are readily disposable. A typical type of foodstuff which may be so provided is the well-known ice cream cone which, of course, includes various equivalents such as sherbets, Italian ices and so forth.

Other types of foodstuffs which may be served in receptacles of various shapes include souvlaki, French fries and fish and chips. In addition, there are various other types of articles and materials which are carried in containing receptacles which are generally open at the top and which generally have their containers configured in the form of inverted cones.

These marketed items have in common the fact that the protrusion of the contained articles from the top thereof makes such articles readily disposed to contamination from the ambient atmosphere to which they are exposed. In addition, these marketable items have in common the fact that the protruding consumable portions may readily be displaced from the receptacle to fall to the ground, in which case they are generally considered contaminated and therefore useless.

Although substantial effort has been expended in studying the prior art to determine whether or not a suitable protective device or guard has been previously proposed, no such guard or device has been discovered and the instant invention is thus regarded as completely novel and as readily distinguishable from various constructions known for other purposes besides those for which the present invention is intended.

SUMMARY OF INVENTION

It is an object of the invention to provide an improved device for receiving and enhancing the conditions for utilizing objects or articles accommodated in and protruding from a receptacle.

It is a more specific object of the invention to provide an improved device for receiving and enhancing the conditions for the devouring of a foodstuff such as an ice cream portion accommodated in a conical receptacle as well as like consumable articles such as souvlaki and French fries and the like.

It is still another object of the invention to provide an improved device of the above type which is readily produced by mass production techniques and therefore results in the achievement of the objectives of the invention at relatively low cost.

Still another object of the invention is to provide an improved design for a device of the type indicated above, which may be either disposable or reuseable according to the materials employed in the manufacture of the same.

In achieving the above and other objects of the invention, there is provided a device comprising a first portion or part for internally accommodating the receptacle into which the dispensed portion is to be placed, the first part being portable and adapted for being grasped in a hand of a user, and a second part arranged on the first part and extending from the same to encompass at least partially the protruding dispensable material to shield and protect the same and to limit the possibilities of displacement of the protruding material from the receptacle. According to a feature of the invention, the second part is displaceable on and relative to the first part to vary the extension of the second part therefrom. According to a further feature, a third part may be fixed on the first part and configured to facilitate grasping by the hand of the user. This third part, for example, may be configured as part of a cylinder.

According to a feature of the invention, a slide may be provided coupling the first and second parts to permit the relative movement therebetween. In a specific example the receptacle is a cone and the first part is configured as at least part of a hollow cone having an interior space of a size adapted to receive the conical receptacle. The second part may be configured as part of a cylinder having a size adapted for at least partially embracing the conical first part while being freely moveable in axial direction relative to the same. It will be noted in the description which follows hereinafter that the first and second parts are preferably coaxial and thus have coextensive axes.

As will be noted in the detailed description which follows below, the device is provided with a slide and sliding member engaged in the slide, the slide and sliding members being coupled to respective of the first and second parts for relative movement parallel to the above noted axes. It will also be noted hereinafter that a cylindrical hand grip of the type noted above is interposed between and connects the slide and first part, the slide extending rectilinearly along the grip to define a rectilinear path of movement for the sliding member and therefore for said second part.

As will also be seen in the following description, a protrusion is provided on, and extending from, the above-noted sliding member to provide for manipulating the sliding member and thereby the second part.

Other features of the invention include that the device has a normal, generally upright position of use and therefore a top and a bottom and that the second part tapers upwardly. A further feature of the invention is that the first part includes inwardly directed protrusions cooperatively providing a support for the above-noted receptacle.

To put the device in perspective it is to be noted that the first part has a height in the order of magnitude of from about 3 to 5 inches although this range can be readily exceeded within the scope of the invention. Similarly, the second part has a height in the order of magnitude of from about 1 to 3 inches, this dimension also being readily exceeded within the scope of the invention.

It will be noted that the sliding member engages the slide mentioned above with a magnitude of friction which is adequate to restrain loose movement therebetween, but which is inadequate to prevent manually controlled movement therebetween. As will also be shown, the first and second parts mentioned above are preferably of a plastic such as for example polyeythylene or polystyrene.

Other objects, features and advantages of the invention will be found in the following detailed description as illustrated in the accompanying drawing.

DETAILED DESCRIPTION

Figure 1:
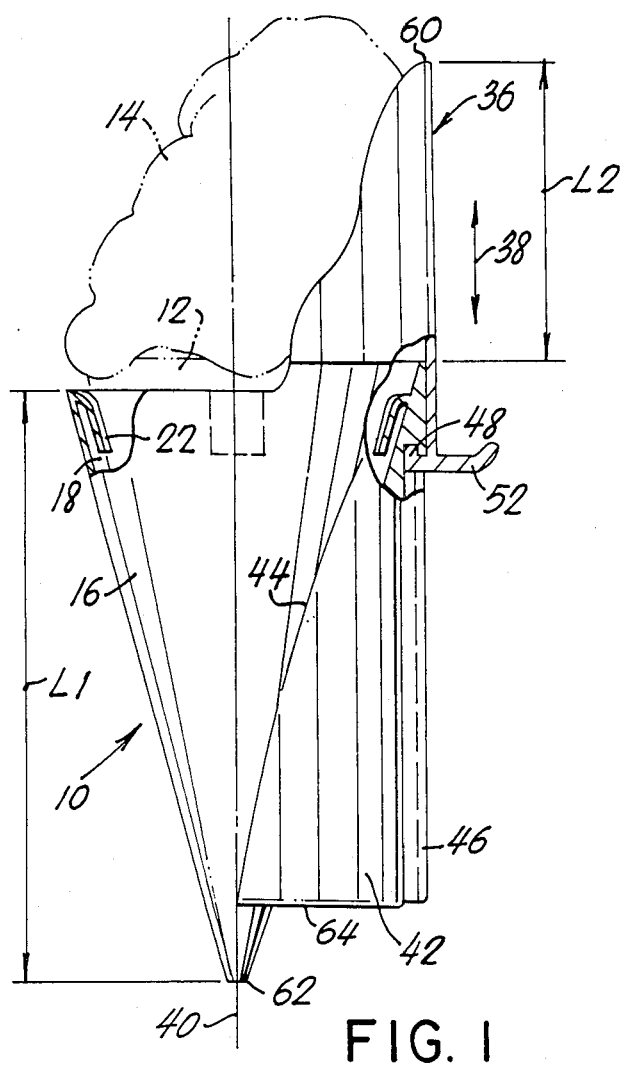
FIG. 1 is a side view of an ice cream scoop guard provided in accordance with a preferred embodiment of the invention.
Figure 2:
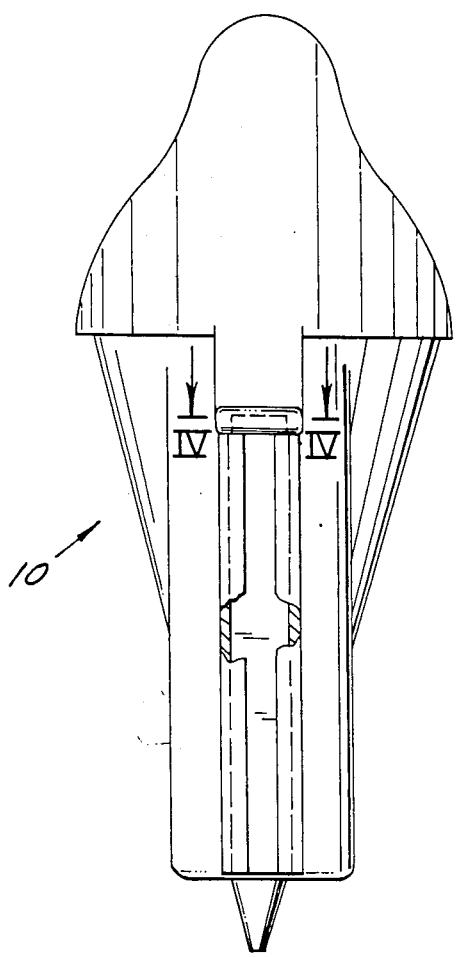
FIG. 2 is a rear view of the scoop guard of FIG. 1.
Figure 3:
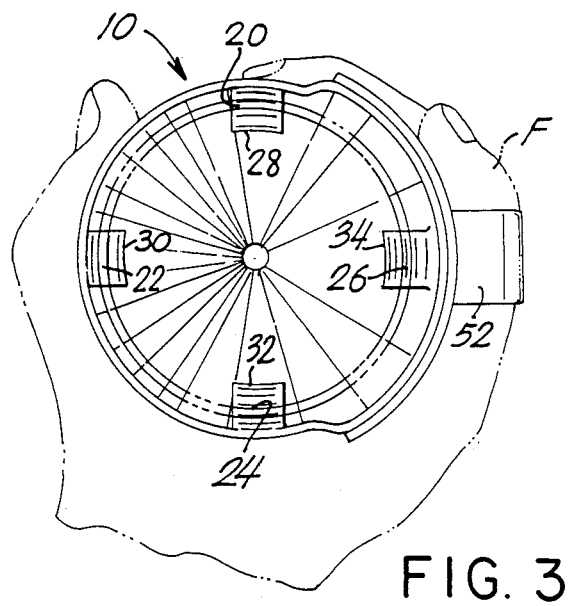
FIG. 3 is a top view of the scoop guard grasped in the hand of a user.

In FIGS. 1-3 of the drawing is illustrated a scoop guard 10 provided in accordance with a preferred embodiment of the invention. This scoop guard is intended to receive and enhance the conditions for the devouring of a foodstuff accommodated in and protruding from a receptacle. Such a receptacle is indicated in the drawing at 12. In the illustrated example this receptacle is constituted by a conical receptacle formed of an edible material of conventional type. It is provided with an open upwardly directed mouth wherein is located a scoop 14 of ice cream. Although an ice cream cone has been chosen for purposes of illustration, it will be readily appreciated that other forms of edible and other types of material may be readily supplied in this form. Firstly, there are a group of materials similar to but somewhat different from ice cream including but not limited to sherbet, Italian ice, and the like. It is also possible to dispense other edible materials in this form as has been noted hereinabove and including, but not limited to souvlaki, French fries, fish and chips and so forth. In addition, it is possible to dispense non-edible material in this form such as, for example, screws, nails, bolts and so on. The use of the invention for various dispensable materials is limited only by imagination, and various types of materials and articles or objects are envisaged to be within the scope of the invention, although ice cream cones and like edible substances are contemplated as the leading use for the invention.

Similarly, it is to be noted that the conical receptacle 12 need not be of an edible material, but may be of other materials either disposable or otherwise, such as paper, plastic and so on. Moreover, the shape need not be precisely conical as other forms of holders are envisaged such as, for example, pyramidal and cylindrical and so forth.

In FIGS. 1-3 the first part of the scoop guard of the invention is indicated at 16. It is of a shape conforming to that of the receptacle to be accommodated therein. For this purpose the first part has an interior chamber 18. It is preferably provided also with inward projections seen at 20, 22, 24 and 26, these projections cooperatively defining a sloped surface at 28, 30, 32 and 34 against which the conical receptacle 12 may abut when inserted into the first part 16. Part 16 preferably defines a closed circle at the upper extremity thereof.

The second part of the device of the invention is indicated at 36. This part is a segment of a cylinder having a cylindrical surface. It has a diameter or dimension sufficient to permit embracing the part 16 towards the upper and largest dimension thereof so that the part 36 can move in the direction shown by the arrow 38(i.e., upwardly and downwardly) without interference with or from the part 16. It will be noted that the part 36 and the part 16 are coaxial or concentric about a common and coextensive set of axes indicated at 40. It is also to be noted by way of example that in a preferred version of the device of the invention the first part has a height or dimension L1 which lies in the range of from about 3 to 5 inches whereas the second part 36 has a height or vertical extension in the order of magnitude of about 1 to 3 inches.

Figure 4:
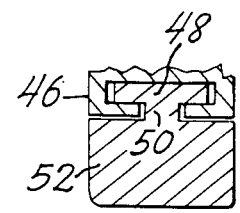
FIG. 4 is a sectional view taken along line IV—IV of FIG. 2.

To facilitate grasping by the hand of a user the device may furthermore be provided with a third part indicated at 42. This third part 42 is a section of a cylinder having a smaller diameter than the diameter of the part 36. The part 42 is attached to part 16 and intersects with the profile of the latter along a line indicated at 44. This part, in addition to facilitating grasping by the hand of a user, has a further function. This further function is to form a surface to accommodate a rectilinear slide indicated at 46 (see also FIG. 4) which accommodates therein a slide member 48. This slide member 48 has a rib therealong indicated at 50, extending outwardly of slide 46 and supporting a finger lever or protrusion 52. This finger lever is to enable the finger of a user to operate the slide manually whereby the second part or guard or shield 36 may be raised or lowered relative to the scoop 14 to permit a devouring of the same. The finger of the user which may be employed to raise and lower the guard is indicated at F where it is in engagement with the finger lever 52.

The construction of the sliding member and slide and the relative dimensions of the same are intended to provide a magnitude of friction therebetween which is adequate to prevent loose movement therebetween, but inadequate to prevent manually controlled movement therebetween. In other words, the sliding member can be moved by the finger F to desired position whereafter that position will be retained until the finger operates against the lever 52 to further displace the second part 36 in either of the directions indicated by the arrow 38.

It will be further noted that the illustrated preferred posture of the device of the invention in FIGS. 1 and 2 is upright and that this constitutes the normal position of use of the device. In the normal position of use of the device the device has a top end indicated at 60 and a bottom end indicated at 62. The bottom end in the preferred version will extend below the bottom 64 of the third part 42.

From the above description will be readily envisaged how the device of the invention is applied for the dispensing and guarding of materials other than edible materials and particularly ice cream cones. It will also be apparent that the second part 36 may find further use as a scooping device as well as for protecting the edible materials or the like from contamination born upon the winds inasmuch as part 36 serves as a controllably extendible guard or shield or the like. It will also be apparent that the part 36 will guard against the spilling of the material or object 14 from the receptacle 12 since it will provide a support against which the object or foodstuff 14 may be supported or limited in movement.

There will now be obvious to those skilled in the art many modifications and variations of the construction set forth hereinabove and in the drawing. Such modifications and variations will not depart from the scope of the invention if defined by the following claims or equivalent thereto.

What is claimed is:

1. A device for receiving and enhancing conditions for the devouring of a foodstuff accommodated in and protruding from a receptacle, said device comprising first means for internally accommodating said receptacle, said first means being portable and adapted for being grasped in a hand of a user, and second means on said first means and extending from the same to encompass at least partially the protruding foodstuff to shield and protect the same and to limit the possibilities of displacement of the protruding foodstuff from said receptacle, the second means being displaceable on said first means to vary the extension of the second means therefrom, and third means fixed on said first means and configured to facilitate grasping by the hand of the user, the third means being configured as part of a cylinder.

2. A device as claimed in claim 1 wherein the first and second means are of plastic.

3. A device for receiving and enhancing conditions for the devouring of a foodstuff accommodated in and protruding from a receptacle, said device comprising first means for internally accommodating said receptacle, said first means being portable and adapted for being grasped in a hand of a user, and second means on said first means and extending from the same to encompass at least partially the protruding foodstuff to shield and protect the same and to limit the possibilities of displacement of the protruding foodstuff from said receptacle, the second means being displaceable on said first means to vary the extension of the second means therefrom, and slide means coupling the first and second means to permit relative movement therebetween.

4. A device for receiving and enhancing conditions for the devouring of a foodstuff accommodated in and protruding from a receptacle, said device comprising first means for internally accommodating said receptacle, said first means being portable and adapted for being grasped in a hand of a user, and second means on said first means and extending from the same to encompass at least partially the protruding foodstuff to shield and protect the same and to limit the possibilities of displacement of the protruding foodstuff from said receptacle, the second means being displaceable on said first means to vary the extension of the second means therefrom, the receptacle being a cone and said first means being configured as at least part of a hollow cone having an interior space of a size adapted to receive said receptacle, said second means being configured as part of a cylinder having a size adapted for at least partially embracing said first means while being freely movable in axial direction relative to the same.

5. A device as claimed in claim 4 wherein first and second means are coaxial with coextensive axes.

6. A device as claimed in claim 4 comprising a slide and a sliding member engaged in the slide, the slide and sliding member being coupled to respective of the first and second means for relative movement parallel to said axes.

7. A device as claimed in claim 6 wherein a cylindrical hand grip is interposed between and connects the slide and first means, the slide extending rectilinearly along the grip to define a rectilinear path of movement for the sliding member and, therefore, for said second means.

8. A device as claimed in claim 7 comprising a protrusion on and extending from said sliding member to provide for manipulating the sliding member and thereby the second means.

9. A device as claimed in claim 6 wherein the sliding member engages the slide with a magnitude of friction which is adequate to prevent loose movement therebetween but inadequate to prevent manually controlled movement therebetween.

10. A device as claimed in claim 4 wherein the device has a normal generally upright position of use and therefore a top and bottom and said second means tapers upwardly.

11. A device as claimed in claim 10 wherein the first means has a height in the order of magnitude of from about 3–5 inches and the second means has a height in the order of magnitude of from about 1 to 3 inches.

12. A device as claimed in claim 4 wherein the first means comprises inwardly directed protrusions cooperatively, providing a support for said receptacle.

13. A device as claimed in claim 4 wherein said first part defines a closed circle at the upper extremity thereof.

* * * * *